July 18, 1933. J. Y. TAYLOR 1,918,298
EDUCATIONAL DEVICE
Filed April 18, 1932 3 Sheets-Sheet 2
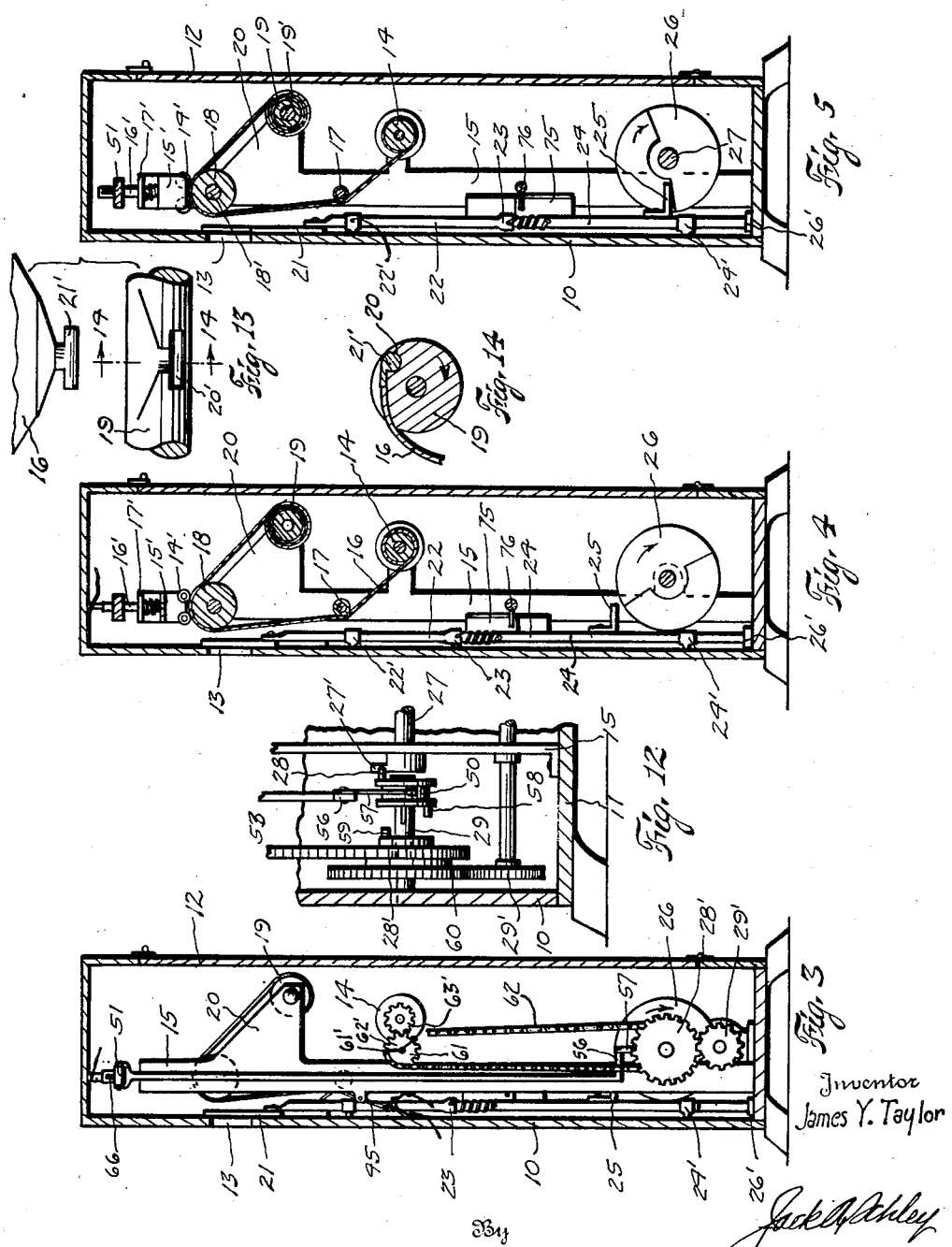

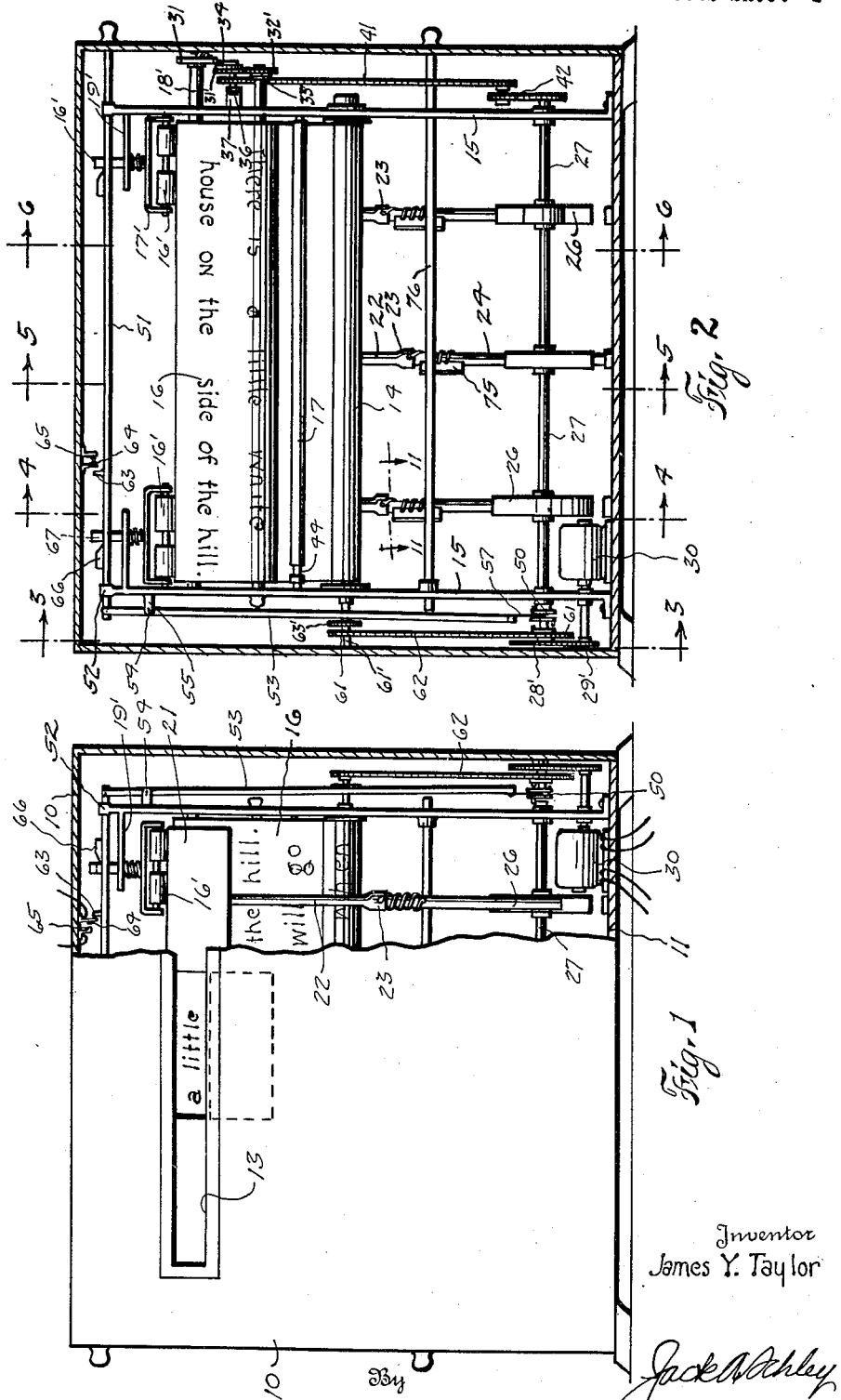

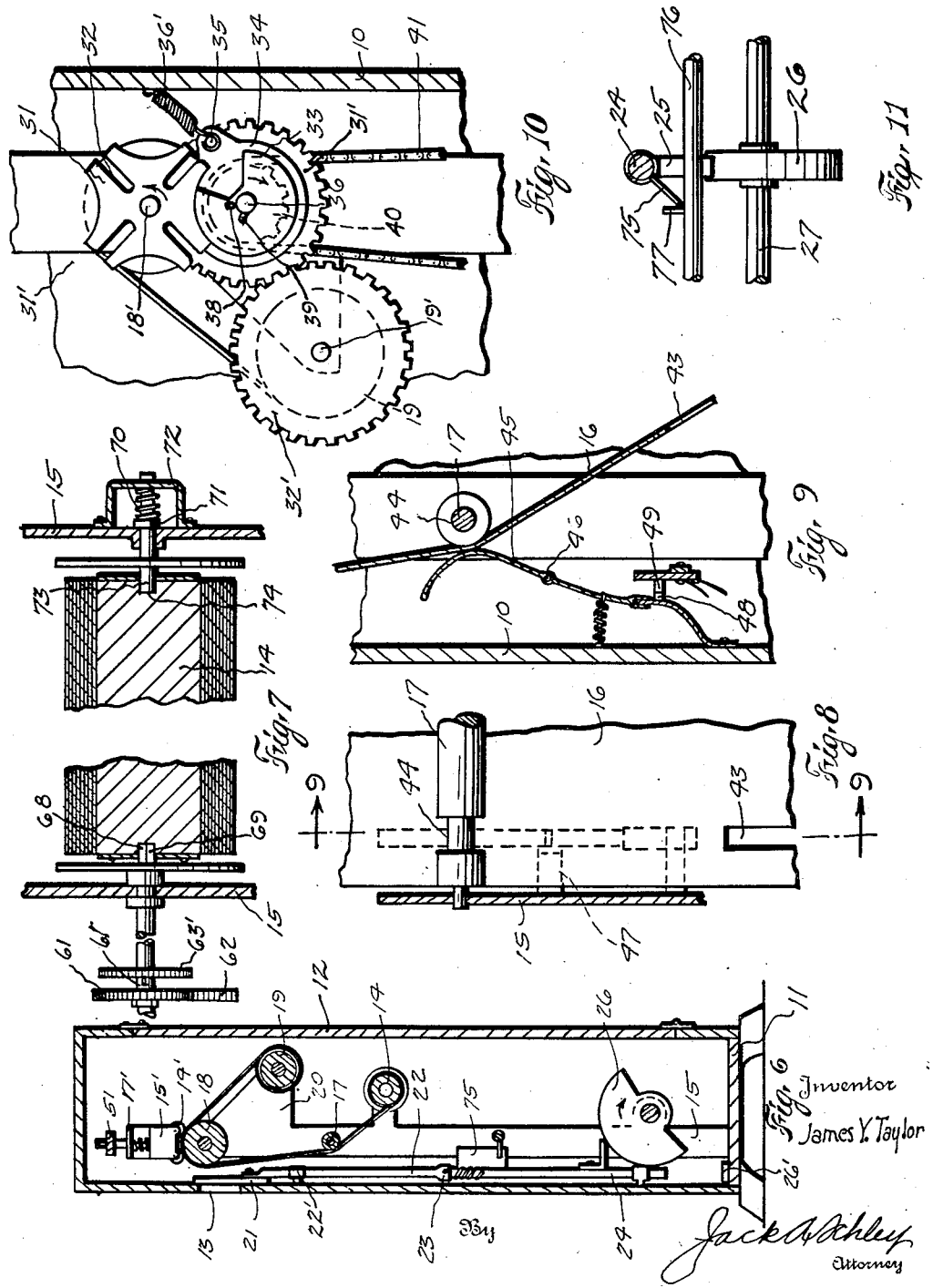

Patented July 18, 1933

1,918,298

UNITED STATES PATENT OFFICE

JAMES Y. TAYLOR, OF BROWNWOOD, TEXAS, ASSIGNOR OF TWO-FIFTHS TO DOUGLAS COALSON, OF BROWNWOOD, TEXAS

EDUCATIONAL DEVICE

Application filed April 18, 1932. Serial No. 605,878.

REISSUED

This invention relates to new and useful improvements in educational devices.

One object of the invention is to provide an improved device for educational purposes, and especially for the teaching of reading.

Another object of the invention is to provide means for successively exhibiting and concealing indicia whereby the observer's eye travels from left to right across the face of the machine.

Another object of the invention is to provide an exhibiting machine having an elongated window in its front wall and having a strip or roll, with indicia or symbols printed thereon, so mounted within the machine that the entire strip may be displayed, line by line, through the window, and to provide means for operating panels which successively close portions of the window to cover portions of the indicia or symbols on the strip, and thereby force the pupil's eyes to travel from left to right across the face of the machine.

Another object of the invention is to provide means for actuating the strip or exhibitor to bring the next line of the same into view after the panels have been operated.

Still another object of the invention is to provide means whereby the panels may be operated rapidly enough to allow the word or words to be visible only for a moment, thus teaching the pupil to instantly recognize the word.

Figure 1 is a front view of the machine, partly in elevation and partly in section, Figure 2 is a longitudinal vertical sectional view looking from the rear of the machine, Figure 3 is a transverse vertical sectional view taken on the line 3—3 of Figure 2, Figure 4 is a transverse vertical sectional view taken on the line 4—4 of Figure 2, Figure 5 is a transverse vertical sectional view taken on the line 5—5 of Figure 2, Figure 6 is a transverse vertical sectional view taken on the line 6—6 of Figure 2, Figure 7 is an enlarged detail of the removable carrying roller mounting, Figures 8 and 9 are enlarged details of the automatic cut-off switch, Figure 10 is an enlarged detail of the spacer roller actuating means, Figure 11 is a sectional view taken on the line 11—11 of Figure 2 and showing the plunger shifting means, Figure 12 is a detail of the reversible clutch, and Figure 13 is a detail of the winding roller and one end of the strip, showing means for securing said end to the roller.

Figure 14 is a transverse sectional view of the same and taken on line 14—14 of Figure 13.

In the drawings the numeral 10 designates an upright casing having a bottom 11 and provided with a door 12 in its rear wall to permit the easy insertion or removal of the rolls hereinafter mentioned.

A horizontally elongated sight opening or window 13 is provided in the front wall of the casing near its top. Within the casing, a removable supply roller 14 is mounted in standards 15 which are secured to the floor of the casing and extend upwardly within the same. The roller 14 carries a strip of cloth, paper or other suitable material 16 on which is printed a series of sentences or other educational indicia.

The strip 16 is passed upwardly and over an idler roller 17 mounted in standards 15 and then over a spacer roller 18 which is mounted in the standards above the elongated window 13. Friction rollers 14' (Fig. 2) are mounted in hanger yokes 15' and each hanger has a spring-pressed plunger 16' extending upwardly therefrom. Each plunger has a sliding fit in arms 17' which extend inwardly from the standards 15 whereby the rollers are capable of a vertical movement but are held against horizontal displacement. The friction rollers ride on the spacer roller 18 to hold the strip 16 tightly against the same.

The end of the strip 16 is then secured to a winding roller 19 which is supported by arms 20, extending rearwardly from the standards 15 (Figs. 3, 4, and 5). The winding roller is provided with a T slot 20', and one end of the strip 16 carries a key 21' which engages in said slot of the roller (Figs. 13 and 14). Thus when the key engages the slot the strip 16 may be wound around the roller, but the key will automatically disengage itself from the roller when the strip is being rewound, as will hereinafter be explained.

It will be seen that a portion of the strip 16 is held in close proximity to the sight opening of the spacer roller 18 and the idler roller 17, and that portion is clearly visible therethrough. (Fig. 1.)

The words or sentences, printed on the strip or chart 16 are so spaced lengthwise of the strip that they may be successively and individually displayed thru the opening responsive to a step-by-step actuation of the spacer roller. For positioning the first line of indicia so that it will be exactly in alinement with the window, a knob 10' is provided on one end of the winding roller 19. Before the machine is started this knob is turned to adjust the strip in its proper position.

For exhibiting the words in each line in sequence and thereby forcing the pupils' eyes to travel from left to right, I provide three doors or panels 21 (Figs. 3, 4, and 5). Each panel is secured to and carried by a vertical rod 22, which is supported by a bearing 22'. Each rod is connected by a spring coupling 23 to a plunger 24. Each plunger is slidably mounted in a bearing 24' and is provided with a foot 25 which is normally positioned in the path of a cam 26, mounted on a horizontal cam shaft 27, which is supported at its ends in the standards 15. A step cushion 26' is secured on the bottom 11 below each plunger 24 to absorb the shock when said plunger drops to its lowest position.

The cam shaft is provided with a lug 27' (Fig. 12) on one end and this lug is engaged by a pin 28 on one side of a clutch 50 which is slidably keyed on a stub shaft 29 (Figs. 1 and 12). The stub shaft 29 is supported in the side wall of the casing and carries a gear 28', which is driven by a gear 29' on the shaft of an electric motor 30. The cams are disposed in stepped order so that the panels are opened and closed successively. For instance, when the panel on the left is lowered (Fig. 1) to allow the first words of the line to be seen the middle and right hand panels are in their raised or closed position. As the left hand panel rises, the middle panel is lowered and the panel on the right remains closed, or in its raised position, as is shown in Fig. 1. Then, as the middle panel rises to again shut the words off from view the right hand panel lowers and the panel on the left remains in its topmost position. Thus, only one third of each line is visible at a time. This is an important feature of the invention as it forces the pupil to instantly recognize the words, as well as to accustom his eyes to travel across the board from left to right (Fig. 1).

After each panel 21 has been operated once and the entire line has been read, the spacer roller 18 is given a quarter turn to bring the next line into view thru the opening 13. For actuating the spacer roller, one quarter of a turn after the successive operation of the three panels 21, a star wheel 31 (Fig. 10) is mounted on one end of the shaft 18' of said roller. The star wheel is provided with elongated radial slots 32, and has its outer edge riding on a shoulder 33 of a cam disk 34. A pin 35 mounted on the outer edge of the cam disk engages in the slots 32 to give the wheel a quarter turn each time the cam makes one complete revolution.

The cam disk 34 is loosely mounted on a stub shaft 36 (Figs. 2 and 10) supported in a bracket 37 extending outwardly and rearwardly from one of the standards 15. The cam is provided with a lug 38, on its outer face near its center, in the path of a pin 39 secured on the shaft 36, whereby the cam is revolved by the shaft when the pin engages the lug.

The stub shaft carries a gear 40 at its inner end and this gear is driven by a chain 41 extending upwardly from a reverse gearing 42, which, in turn, is driven by the cam shaft 27. Thus the stub shaft revolves in the opposite direction from the cam shaft and at the same speed. Each time the cam shaft makes one complete revolution and each of the cams 26 has been operated to raise or lower its respective panel 21 the pin 35 on the cam 34 engages one of the slots 32 in the star wheel to turn the spacer roller 18, thereby bringing the next line of the chart 16 into alinement with the slot. The pin 35 on the cam is pivotally connected to a spring 36' which has its other end secured to the side wall of the casing. Due to loose mounting of the cam on the stub shaft, the spring serves to jerk the cam around quickly when the pin passes the center line of the cam. This movement allows for an immediate change of lines of the chart before the opening. The star wheel is prevented from being given more than a quarter turn each time by the friction caused by the engagement of the outer edge of the star wheel with the shoulder 33 on the cam. A gear 31' is secured on the rear of the cam disk 34 and revolves therewith. This gear engages a gear 32' mounted on the outer end of the shaft 19' of the winding roller. The gear 32' drives a friction clutch 33' on the shaft 19' and it is obvious that each time the cam disk is revolved the winding roller is rotated, thereby taking up any slack in the chart 16.

For automatically cutting off the motor after the entire strip or chart 16 has been displayed before the opening 13, the strip is provided with an elongated slot 43. (Figs. 8 and 9.) The idler roller 17 has a groove 44 at one end which is alined with the slot 43. A flat spring 45 pivoted at 46 to a bracket 47 extending inwardly from one of the standards 15, has its upper end constantly riding against the face of the chart 16. The lower end of the spring carries a contact point 48 which is held against a contact 49 to complete the circuit to the motor. It is obvious that as long as the upper end of the spring is held outward by the chart 16 the circuit to the motor is complete. However, as the chart nears its end the slot 43 in the same passes over the groove 44 to allow the upper end of the spring 45 to drop into said groove. Due to the pivotal mounting of the spring the contact points 48 and 49 are separated, thereby breaking the circuit and stopping the motor.

For rewinding the carrying roller 14 I provide a horizontal rod (Figs. 1 and 2) 51, at the top of the casing. The rod extends almost the entire length of the casing and has one end extending through the outer wall of the same. The rod is slidably supported by the wall of the casing and by bearings 52 extending upwardly from the top of the standards 15. The inner end of the rod is pivotally connected to a vertical bar 53 which is pivoted at 54 to a bracket 55 on the standard 15 (Fig. 2). The lower end of the bar is provided with a foot 56 (Fig. 3) which carries a flat spring 57. The spring straddles the clutch 50 and it is obvious that when the rod 51 is pulled outwardly the clutch will be disengaged from the cam shaft 27. On its side opposite the cam shaft, the clutch carries a pin 58 which, when the clutch is shifted, engages a lug 59 on a gear 60 mounted on the stub shaft 29. The gear 60 drives a gear 61 on a stub shaft 61', by means of a chain 62. The other end of the stub shaft carries a gear 62' which drives a gear 63' on the shaft of the carrying roller, to rewind the strip after it has been displayed.

The rod 51 carries a lug 63 which is in alinement with a contact point 64, leading to the motor and depending from the top of the casing. It is seen that when the rod 51 is pulled outwardly the lug 63 will strike the contact 64 and force it against a contact 65 which will complete the circuit to again start the motor which has been stopped by the breaking of the contacts 48 and 49 due to the spring 45, dropping thru the slot 43 in the chart into the groove 44 of the idler roller. The shifting of the rod 51, as hereinbefore explained, shifts the clutch 50, whereby the strip is rewound on the roller.

The rod 51 also carries cams 66 which engage in slots 67 in the friction roller plungers 16' to raise the same when the rod is pulled outwardly. Thus the friction rollers 16' are lifted from the spacer roller 18 when the chart is being rewound on the carrying roller.

The carrying roller 14 is made removable so that a chart containing different material may replace the same. It is to be clearly understood that the invention is not to be limited to charts carrying educational indicia, such as words, phrases, arithmetic, or the like, but a chart carrying advertising material can be inserted in the machine whereby the device can be used for any form of progressive advertising. The mounting of the roller 14 is shown in detail in Figure 7. At one end the roller is provided with a square socket 68 which receives the squared shaft 69. The other end of the shaft carries the gear 63' which is driven thru the gears 61 and 62' by the chain 62.

The other end of the roller has a circular bore 74 which receives a pin 73. The pin is supported in one of the standards 15 and a spring 70 is confined on the pin between a collar 71 on said pin and a casing 72 secured on the outer side of the standard. It is obvious that the carrying rollers may be easily inserted or removed by depressing the pin 73.

It is not always necessary to operate the panels 21 when using the machine and it has been found that at times the machine may be used to better advantage by eliminating the use of these panels. For swinging the feet 25 of the plungers 24 out of the path of the cams 26 I provide wings 75 on the rear of the plungers 24. A horizontal rod 76 slidably supported in the standard 15 has one end extending thru the outer wall of the casing 10. As shown in Fig. 11, the rod is provided with fingers 77 which, when the rod is pulled outwardly, engage the wings to swing the feet out of the path of the cams 26 due to the spring coupling 23. Should any of the cams 26 be in such a position as to prevent its respective foot 25 from swinging back to its normal position when the rod is again pushed inwardly, the spring coupling 23 would serve to hold said foot against the side of the cam until the cam revolves around to a position which will allow said foot to spring into place in the path of said cam.

The description which has been given, recites more or less detail of a particular embodiment of the invention, which is set forth as new and useful. However, I desire it understood that the invention is not limited to such exact details of construction, because it is manifest that changes and modifications may be made, within the scope of the appended claims, without departing from the spirit of the invention.

Having illustrated and described a preferred form of the invention, what I claim, is:

1. In an educational device, a casing having a window, an exhibitor mounted within the casing and bearing indicia or symbols for display through the window, panels carried by the casing and closing said window, means for operating said panels in sequence from left to right, whereby portions of each line of indicia are displayed in sequence.

2. In an educational device, a casing having a window, a strip mounted within the casing and bearing indicia or symbols for display thru the window, means for opening and closing sections of the window, means for operating said opening and closing means in sequence from left to right whereby portions of each line of indicia are displayed in sequence, and means for actuating the strip whereby the next line of indicia becomes visible thru the window after the preceding line is displayed.

3. In an educational device, a casing having a window, a strip mounted within the casing and bearing indicia or symbols for display through said window, panels within the casing and closing said window, movable members connected to said panels, means for actuating said members in sequence whereby the panels are successively raised and lowered in sequence from left to right to exhibit portions of each line of indicia in sequence.

4. In an educational device, a casing having a window, an exhibitor mounted within the casing and bearing indicia or symbols for display through said window, panels within the casing and closing said window, rods carrying said panels, plungers below said rods and swiveled thereto, cams mounted at the bottom of the casing and arranged to operate said panels in sequence from left to right through the medium of the said plungers and rods, whereby portions of each line of indicia are displayed in sequence.

5. In an educational device, a casing having a window, an exhibitor mounted within the casing and bearing indicia or symbols for display thru said window, panels within the casing and closing the window, rods carrying said panels, plungers below said rods and swiveled thereto, cams mounted at the bottom of the casing, said plungers riding on the periphery of said cams, the cams being arranged to raise and lower the plungers in sequence whereby portions of each line of indicia are displayed in sequence from left to right, and means for disengaging the plungers from the cams to allow the entire line to be visible thru the window.

6. In an educational device, a casing having a window, a carrying roller within the casing, an idler roller within the casing and above the carrying roller, a spacer roller within the casing above the idler roller, a winding roller within the casing below and behind the spacer roller, a strip having indicia thereon mounted on the carrying roller and passing over said idler and spacer rollers, and having its other end secured to said winding roller, means for opening and closing sections of the window, means for operating said opening and closing means, whereby separate sections of the window are opened in sequence from left to right to display portions of each line in sequence and closed after each display, and means for actuating said spacer roller intermittently, whereby each line of indicia is successively brought into view before said window.

7. In an educational device, a casing having a window, a carrying roller within the casing, an idler roller within the casing above the carrying roller, a spacer roller within the casing and above the idler roller, a winding roller within the casing below and behind the spacer roller, a strip having indicia or symbols thereon mounted on the carrying roller and passing over said idler and spacer rollers, and having its other end detachably secured to said winding roller, panels within the casing closing the window, means for opening and closing said panels in sequence from left to right, whereby portions of each line of indicia are displayed in sequence, a star wheel mounted on the spacer roller shaft and having radial slots therein, a cam disk mounted by a stub shaft and having a pin on its outer edge, said pin engaging in slots in said star wheel to rotate the same whereby the spacer roller is revolved to individually and successively display each line of indicia thru the window.

8. A display device comprising, an upright casing having a window, an exhibitor mounted within the casng for display through said window, means for moving said exhibitor to display different portions thereof through said window, means for opening and closing separate sections of the window, and means for operating said closing means, whereby said separate sections may be successively opened and closed from left to right.

9. In an educational device, a casing having a window, an exhibitor mounted within the casing and bearing indicia or symbols for display through the window, means for opening and closing separate sections of the window in sequence from left to right, and means for operating said opening and closing means in sequence, whereby separate sections of the window are opened in sequence to display portions of each line of indicia and are closed after the display of each portion.

10. In an educational device, a casing having a window, a strip mounted within the casing and bearing indicia or symbols for display through the window, means for passing the strip before the window, means for opening and closing separate sections of the window, and means for operating said opening and closing means, whereby separate sections of the window are opened in sequence from left to right to display portions of each line of indicia and closed after each display.

JAMES Y. TAYLOR.